US006969033B2

(12) United States Patent
van der Linden

(10) Patent No.: US 6,969,033 B2
(45) Date of Patent: Nov. 29, 2005

(54) CAMERA MOUNT

(76) Inventor: Garrath van der Linden, PO Box 90, Stirling, 5152 (AU)

( * ) Notice: Subject to any disclaimer, the term of this patent is extended or adjusted under 35 U.S.C. 154(b) by 0 days.

(21) Appl. No.: 10/405,663

(22) Filed: Apr. 2, 2003

(65) Prior Publication Data
US 2003/0194229 A1 Oct. 16, 2003

(30) Foreign Application Priority Data
Apr. 2, 2002 (AU) .................................... PS1437

(51) Int. Cl.[7] .......................................... F16M 11/02
(52) U.S. Cl. ................... 248/177.1; 108/4; 356/399; 396/419; 396/5; 348/94; 378/81
(58) Field of Search ................... 248/177.1, 130, 248/133, 137, 138, 162.1, 415, 425, 141; 248/179.1, 184.3, 184.1; 356/349, 614; 396/419, 396/418, 5; 348/94, 95; 108/4, 22, 143, 141; 378/81, 79

(56) References Cited

U.S. PATENT DOCUMENTS

| 3,608,462 | A | * | 9/1971 | Groshong | ..................... 108/20 |
| 5,857,119 | A | * | 1/1999 | Borden | ......................... 396/5 |
| 5,908,181 | A | * | 6/1999 | Valles-Navarro | ......... 248/177.1 |
| 6,343,184 | B1 | * | 1/2002 | Huebner | ........................ 396/3 |

* cited by examiner

Primary Examiner—Kimberly Wood
(74) Attorney, Agent, or Firm—Klauber & Jackson

(57) ABSTRACT

An omni-positional camera mount for the photographing of small objects (24). The mount has a support (4) to hold an object to be photographed. A first frame (9) is pivotally mounted to the support such that the first frame can pivot on a first pivot axis (12). A second frame (15) is mounted to the first frame (9) such that the second frame can pivot on a second pivot axis (18) which is at right angles to and passing through the first pivot axis. A camera stage is on the second frame. The support (4) can include a turntable and a mounting post. The turntable (4) rotates on a axis which passes through the meeting point (20) of the first and second axes.

4 Claims, 5 Drawing Sheets

CAMERA MOUNT

FIELD OF INVENTION

This invention relates to an omni-positional mounting system and more particularly to an omni-positional camera mounting system useful for the photographing of objects.

BACKGROUND OF THE INVENTION

This invention will be discussed in relation to the photography of opals for display and sale purposes and particularly to video photography, however, the invention is not so limited and may relate to photographing of many types of small object or to other applications where omni-positional observation and treatment of an object is desired.

BRIEF DESCRIPTION OF THE INVENTION

In one form therefore although this may not necessarily be the only or broadest form the invention is said to reside in an omni-positional mount adapted for the support and observation or treatment of an object, the mount including;
  a support to hold an object to be observed or treated;
  a first frame pivotally mounted to the support such that the first frame can pivot on a first pivot axis;
  a second frame mounted to the first frame such that the second frame can pivot on a second pivot axis which is at right angles to and passing through the first pivot axis; and
  a stage on the second frame, the stage being adapted to receive an observation or treatment device.

The observation or treatment device which can be mounted onto the stage may be a camera, video camera, a radiation emitting device such as a x-ray machine or the like.

It will be seen that by this invention by having first and second pivot axes at right angles to each other that the device mounted on the stage can be moved both fore and aft and side to side so that it can be used to photograph, observe or treat the object from any angle.

Preferably to ensure that the object does not appear to move while it is being photographed, observed or treated the support is positioned so that an object placed onto the support is placed or has a selected position on it at the meeting point of the first and second axes.

Preferably the first axis is substantially horizontal and when the camera mount is at rest or a neutral position the second axis is also substantially horizontal.

There may be provided counterweights on one of or each of the first frame and the second frame so that the camera or other device will return to the rest or neutral position.

To further enhance the photography, observation or treatment of the object there may be further provided a turntable on the support on which the object to be viewed or treated is placed and the turntable can be operated so that the object rotates with respect to the observation or treatment device. Preferably the turntable rotates about a third rotational axis which passes through the meeting point of the first and second pivot axes and for convenience is substantially vertical.

The turntable may include a mounting post so that an object to be photographed, observed or treated can be supported above the turntable. This may facilitate viewing of the sides of an object.

Preferably the height of the turntable can be adjusted so that the object can be placed on the turntable or post on the turntable and then the turntable raised or lowered so that a selected point on the object is at the meeting point of the first and second pivot axes and on the turntable rotational axis.

In one embodiment of the invention there may be provided a handle on the second frame so that the camera or other treatment or observation device can be moved about.

Alternatively there may be provided motors such as servo motors to operate the motion of the first and second frames about their pivot axes so that with suitable control equipment the first and second frames and the turntable can be controlled to provide a selected apparent movement of the object on the support.

The camera is preferably a video camera but the invention is also applicable to still cameras.

There may be provided an adjustable stage for the observation or treatment device such that regardless of the type of device mounted onto the stage the operative axis of the device may be placed on the axis of rotation of the turntable. This will ensure that as an object rotating on the turntable is observed or treated, while it appears to rotate, it does not precess as well, that is, it does not appear to move in an orbital manner.

There may be provided lights on the first frame and/or the second frame or elsewhere around the device to illuminate the object to be photographed. Where the lights are on the second frame their position with respect to the camera does not change so that optimum illumination is provided.

To ensure that the object to be photographed is placed exactly at the centre of rotation of the turntable so that it does not appear to precess as it is photographed there may be provided a mounting scale fitted onto the first frame with a hinge arrangement so that the mounting scale can be hinged down to sit above the turntable with suitable guide markings on it.

In an alternative form the invention is said to reside in an omni-positional camera mount adapted for the photographing of small objects, the mount including;
  a support to hold an object to be photographed; a first frame pivotally mounted to the support such that the first frame can pivot on a first pivot axis; a second frame mounted to the first frame such that the second frame can pivot on a second pivot axis at right angles to and passing through the first pivot axis; and a camera stage on the second frame.

Preferably to ensure that the object does not appear to move while it is being photographed from a range of angles or does not move out of the field of view of the camera the support may be positioned so that the object or a selected part of the object is placed at the meeting point of the first and second axes.

To further enhance the photography of the object there may be further provided a turntable on the support on which the object to be viewed is placed and the turntable operated so that the object rotates with respect to the camera. Preferably the turntable rotates about a third rotational axis which passes through the meeting point of the first and second pivot axes and for convenience is substantially vertical.

Preferably the height of the turntable can be adjusted so that the object can be placed so that a selected point on the object is at the meeting point of the first and second pivot axes and the turntable rotational axis.

In a preferred form of the invention the first pivot axis and the second pivot axis are substantially horizontal when the mount is at a rest or neutral position and also the turntable is horizontal.

There may be provided counterweights on one or both of the first frame and the second frame so that the omni-positional mount rest returns to a selected position. The mass or the position of the mass of the or each counterweight may be adjustable so that cameras or devices of varying weights can be mounted on the stage and adjustments made to ensure that the omni-positional mount rest returns to a selected position.

The camera is preferably a video camera but the invention is also applicable to still cameras.

There may be provided an adjustable stage for the camera such that regardless of the model of camera the imaging axis of the camera may be placed on the axis of rotation of the turntable. This will ensure that as an object rotating on the turntable is photographed while it appears to rotate it does not appear to precess or orbit as well.

There may be provided lights on the first frame, the second frame or elsewhere to illuminate the object to be photographed.

To ensure that the object to be photographed is placed exactly at the centre of rotation of the turntable so that it does not appear to precess as it is photographed there may be provided a mounting scale fitted onto the first frame with a hinge arrangement so that the mounting scale can be hinged down to sit above the turntable with suitable guide markings on it.

The omni-positional camera mount according to this invention may be fitted to a base so that it can stand on the ground or have a base adapted to sit on a table for use.

BRIEF DESCRIPTION OF THE DRAWINGS

This then generally describes the invention but to assist with understanding reference will now be made to the accompanying drawings which show preferred embodiments of the invention.

In the drawings.

DESCRIPTION OF PREFERRED EMBODIMENTS

Figure 1:
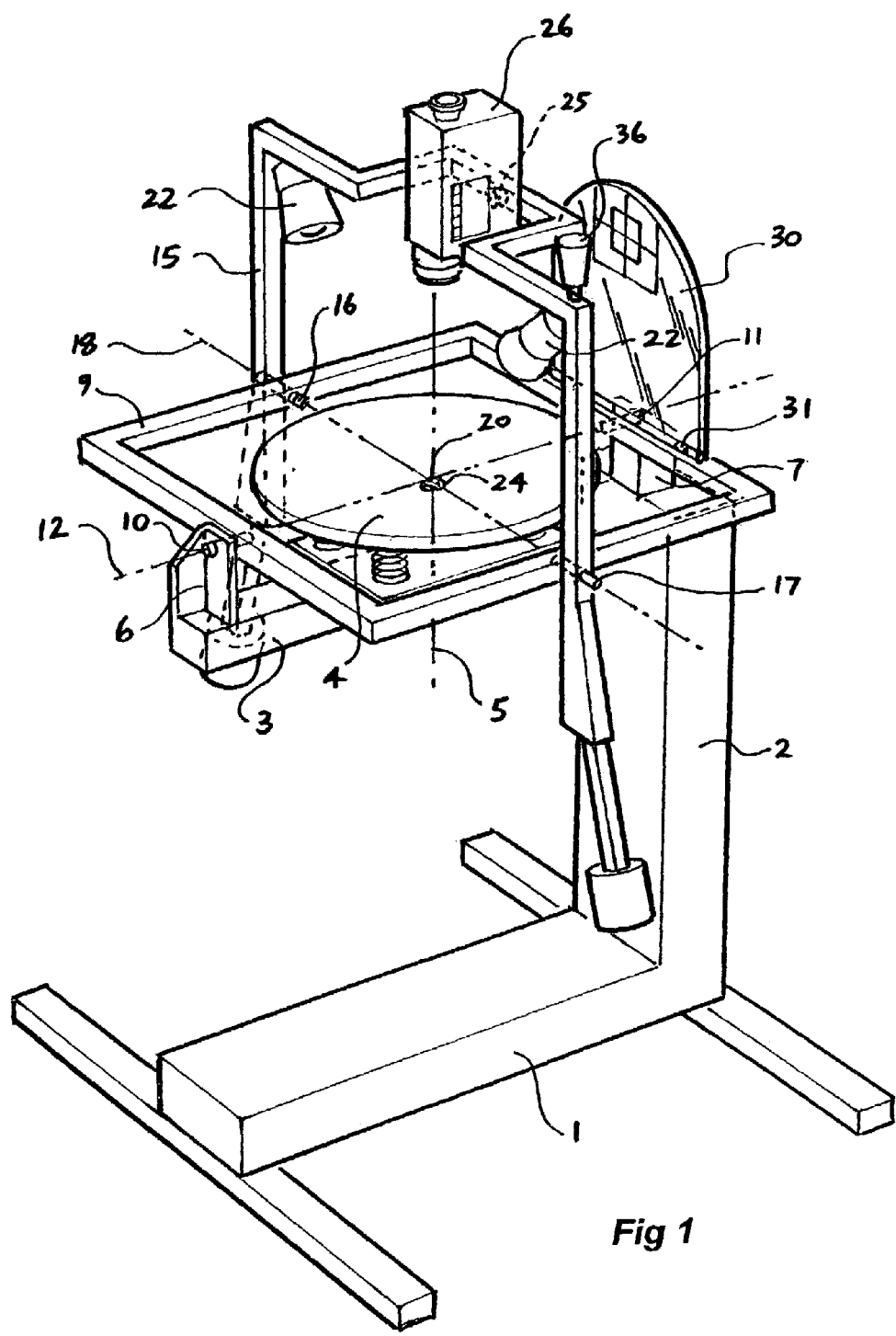
FIG. 1 shows a first embodiment of omni-positional camera mount according to the present invention.
Figure 2:
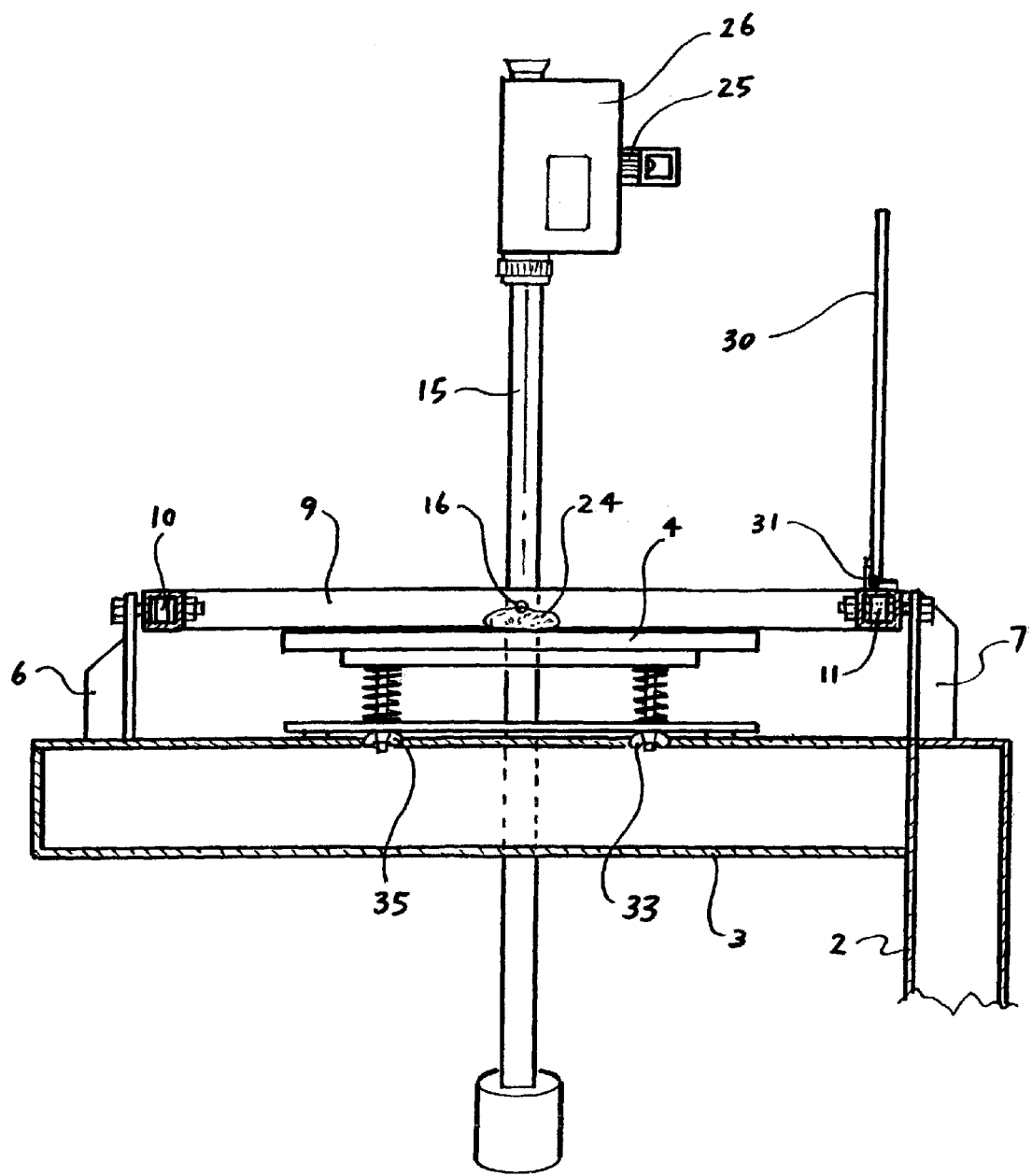
FIG. 2 shows a cross-sectional view of the embodiment shown in FIG. 1.
Figure 3:
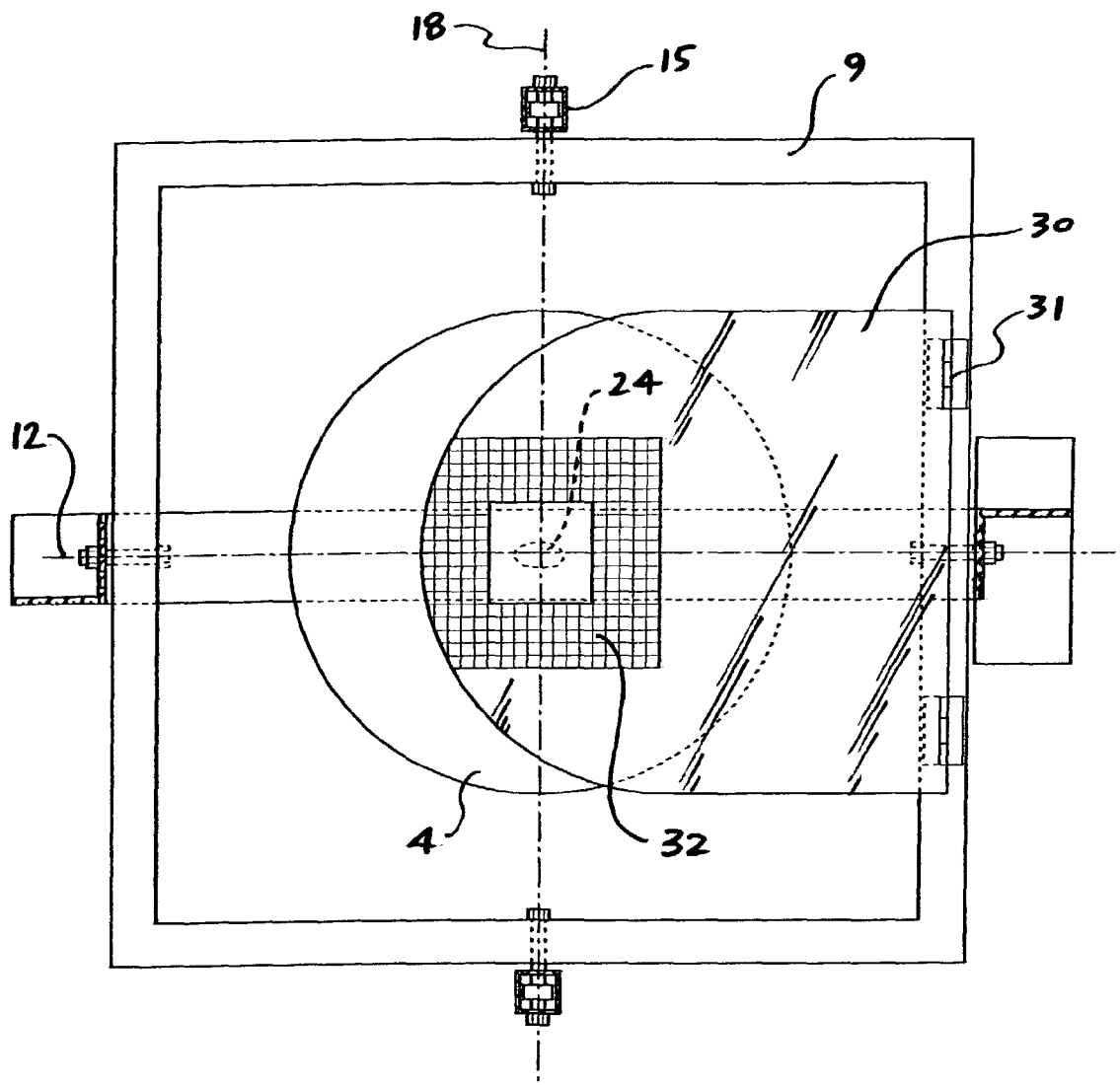
FIG. 3 shows the use of the mounting scale to position an object on the turntable.

Now looking at the drawings and in particular the first embodiment as shown in FIGS. 1 to 3 it will be seen that the omni-positional mount includes a base 1 with an upstanding post 2. On the post 2 is a support 3. The support 3 supports a turntable 4 which is substantially horizontal and adapted to rotate about a turntable rotational axis 5. Also on the support 3 are brackets 6 and 7. The brackets 6 and 7 support a first frame 9 which is supported to be pivotable with respect to the brackets 6 and 7 through pivots 10 and 11 which operate on a first pivot axis 12.

The first frame 9 is substantially square and the pivots 10 and 11 are on the centre of opposite sides.

A second frame 15 is supported on pivots 16 and 17 which engage with the alternative opposite sides of the first frame 9. The second frame 15 can rotate on a pivot axis 18 which is at right angles to and passes through a meeting point 20 with the first pivot axis 12. The axis of rotation 5 of the turntable 4 also passes through the meeting point 20.

Lights 22 are fixed onto the second frame to illuminate an object 24 on the turntable. A video camera mount arrangement 25 is also provided on the second frame. The video camera mount is adapted to mount a video camera 26 so that its imaging axis is on the turntable rotational axis 5.

To assist in placing the object 24 in the correct position so that photographing of the object appears correct, there is provided a mounting scale 30 which is affixed to one of the sides of the first frame 9. The mounting scale 30 is mounted to the frame 9 with a hinge arrangement 31 and has on it a scale arrangement 32 which assists with the positioning of the object 24 at the meeting spot 20 of the first pivot axis and the second pivot axis 11.

As can be seen in FIG. 2 the turntable 4 also includes height adjustment screws 33 and 35 so that the height of the turntable can be adjusted so that preferably the upper surface of the object 24 is at the meeting point 20 of the first and second pivot axes and in line with the turntable axis. This ensures that the main focal point of the object remains in focus as the turntable is rotated and the first and second frames are moved.

To assist with moving of the first and second frames a handle 36 is placed on the second frame near where the camera is mounted. Manual movement of the second frame and first frame by this handle gives the opportunity to film an object on the turntable from all sides and particularly where the object is an opal the change in illumination during this movement shows the flash of colour in the opal.

Figure 4:
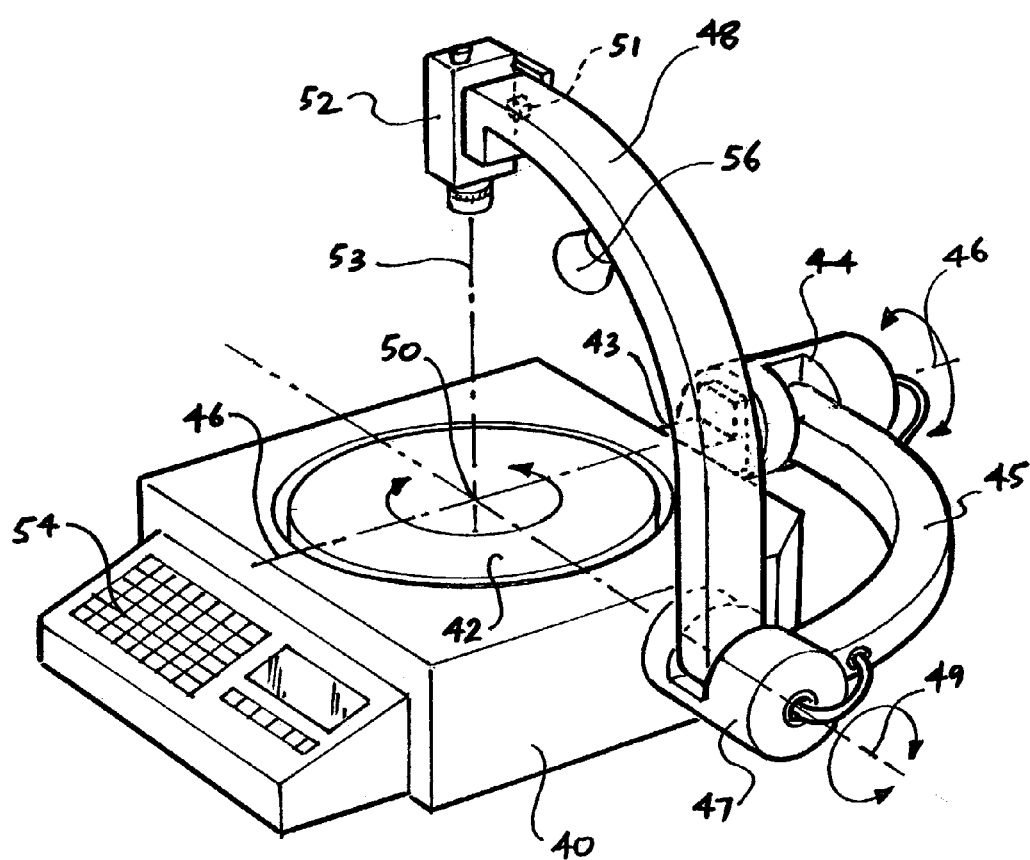
FIG. 4 shows an alternative embodiment of omni-positional camera mount according to the present invention.

FIG. 4 shows an alternative embodiment of omni-positional camera mount according to this invention.

In this embodiment a base 40 is adapted to be positioned onto a table and on the base there is mounted a turntable 42 as well as a side arm 43. On the side arm 43 is a servo motor 44 which is adapted to rotate the arm 45 about a first pivot axis 46.

On the arm 45 is a second servo motor 47 which is adapted to rotate a second arm 48 about pivot axis 49 which is mutually at right angles to the first pivot axis 46 and meets and crosses the pivot axis 46 at a meeting point 50.

On the second arm 48 a camera mount 51 is provided upon which can be mounted a camera 52 so that its imaging axis 53 coincides with the axis of rotation of the turntable 42 and passes through the meeting point 50.

By suitable control in the control panel 54 the servo motors can be operated to move the camera 52 and to move the turntable 42 in any desired motion.

Light 56 is provided on the second frame to illuminate an object on the turntable.

Figure 5:
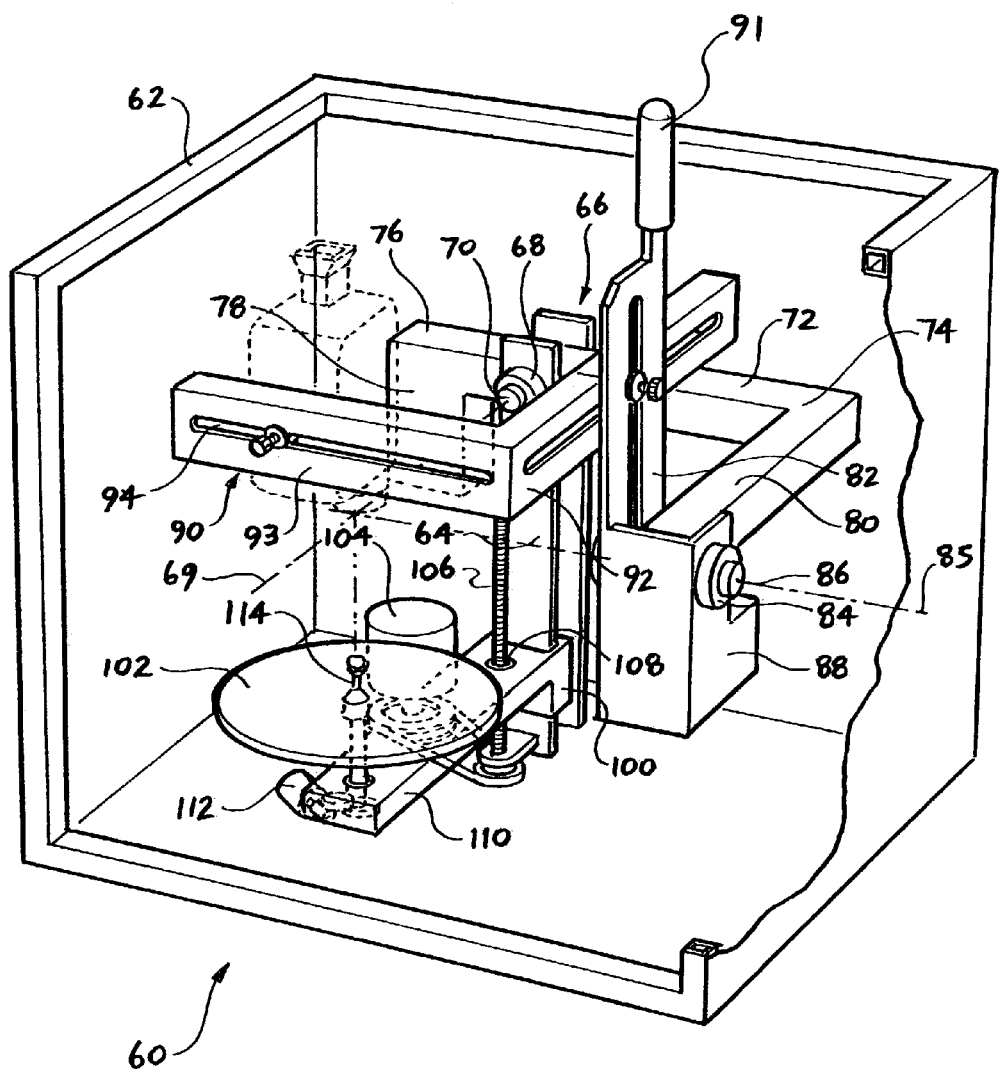
FIG. 5 shows an further embodiment of omni-positional camera mount according to the present invention.

FIG. 5 shows an further embodiment of omni-positional camera mount according to the present invention.

In this embodiment the omni-positional camera mount generally shown as 60 is fitted within a casing 62 which can have a lid (not shown) so that the omni-positional camera mount can be transported to a place it is to be used. The casing is shown partly cut away to show the components within it. Within and at the back of the casing 62 is a tool post 64. At the upper end 66 of the tool post 64 is a pair of bearings 68 mounted to the tool post 64 to give a horizontal front to back first pivot axis 69. Mounted on an axle 70 through the bearings 68 is a first arm 72. At one end 76 of the arm 72 is a counterweight 78. At the other end 74 of the arm 72 is a right angle portion 80 extending to a second arm 82.

The second arm 82 has a pair of bearings 84 with an axle 86 through them defining a side to side second pivot axis 85 and the axle 86 passes through the right angle portion 80 of the first arm so that the second arm 82 can pivot on the axle 86 with respect to the first arm 72. The second pivot axis 85 is substantially at right angles to the first pivot axis 69 and the amount of weight in the counterweight 78 is such that at rest or neutral position the second pivot axis 85 is substantially horizontal. On the second arm 82 is another counterweight 88 hanging down below the axle 86 and an adjustable stage 90 for a camera above the axle 86. A handle 91 is provided on the second arm 82 to facilitate manual movement of the second arm and via the axle 86 the first arm 72.

The stage 90 is in the form of a right angled bracket with a first portion 92 adjustably mounted to the second arm 82 and a second portion 93 which is at right angles to the first portion 92 and having an elongate slot 94. Onto the inner face of the second portion 93 a video camera (shown dotted) can be mounted using a mounting screw through the elongate slot 94. The adjustment of the position of the stage with respect to the second arm and the position of the camera on the stage allow for different dimensions between the imaging axis of the video camera and its mounting surface. It is desirable that at a rest or neutral position the imaging axis of the camera is vertically down, hence the position and/or the mass of the counterweights 78 and 88 may be variable depending upon the mass and position of the video camera mounted onto the stage.

Also mounted onto the tool post 64 is a bracket 100 upon which is mounted the turntable support 102 for an object to be photographed. The position of the bracket 100 on the tool post 64 is vertically adjustable. A motor 104 drives a lead screw 106 which drives a nut 108 mounted onto the vertically adjustable bracket 100 so that the bracket can be moved up and down. The bracket 100 has an arm 110 extending forwardly from it and at its forward end has a bearing support for the turntable 102 and a motor 112 to turn the turntable 102. The motor 112 can be a variable speed motor.

On the turntable 102 is a mounting post 114 upon which an object to be photographed can be mounted. The turntable is mounted substantially horizontally and its axis of rotation 116 passes through the crossing point of the first and second pivot axes 69 and 85. When a camera is mounted onto the stage its imaging axis also passes through the crossing point of the first and second pivot axes 69 and 85.

Preferably the turntable and the mounting post is painted matt black so that its movement is not observed during photography.

To produce a video film of an opal and particularly showing the "fire" in the opal an opal is mounted onto the mounting post 114 and a video camera is mounted onto the stage 90. The position of the camera with respect to the second arm is adjusted so that its imaging axis is vertically down and passes through the crossing point of the first and second pivot axes. The motor 104 is then activated so that a point on the opal, usually the top of the opal, is the crossing point of the first and second pivot axes. The turntable can then be switched on to rotate at between 10 to 20 rpm in a selected direction. Suitable lighting can then be turned on depending upon the effects desired. The camera can then be activated and the handle 91 moved to view and photograph the top and sides of the opal while it is rotating.

While the invention has been discussed with respect to its application to photography its application is not so limited. For instance in the radiographic treatment of a patient it may be desirable to have a defined point of treatment regardless of the angle of a radiation emitting device mounted onto a arm over the patient. By setting up the patient on a support bed so that the organ or region to be treated is at the crossing points of the first and second axes and the radiation emission axis is also passing through the crossing points of the first and second axes the emission device can be moved as desired but the radiation emission axis will be directed to the organ or region of the patient.

Throughout this specification various indications have been given as to the scope of this invention but the invention is not limited to any one of these but may reside in two or more of these combined together. The examples are given for illustration only and not for limitation.

Throughout this specification and the claims that follow unless the context requires otherwise, the words 'comprise' and 'include' and variations such as 'comprising' and 'including' will be understood to imply the inclusion of a stated integer or group of integers but not the exclusion of any other integer or group of integers.

What is claimed is:

1. An omni-positional camera mount including; a support to hold an object to be photographed, a first frame pivotally mounted to the support such that the first frame can pivot on a first pivot axis, a second frame mounted to the first frame such that the second frame can pivot on a second pivot axis at right angles to and passing through the first pivot axis and a camera stage on the second frame, a turntable on the support on which the object to be viewed is placed, and a mounting scale fitted onto the first frame with a hinge arrangement so that the mounting scale can be hinged down to sit above the turntable with suitable guide markings on it to facilitate the positioning of the object onto the support to hold an object to be photographed.

2. An omni-positional camera mount as in claim 1 wherein the turntable is operated so that the object rotates with respect to the camera.

3. An omni-positional camera mount as in claim 2 wherein the turntable is adapted to rotate about a third rotational axis which passes through the meeting point of the first and second axes.

4. An omni-positional camera mount as in claim 1 fitted to a base so that the mount can stand on the ground or have the base adapted to sit on a table for use.

* * * * *